(12) United States Patent
Viswanathan et al.

(10) Patent No.: US 9,063,802 B2
(45) Date of Patent: Jun. 23, 2015

(54) EVENT DETERMINATION

(71) Applicant: Hewlett-Packard Development Company, L.P., Houston, TX (US)

(72) Inventors: Krishnamurthy Viswanathan, Mountain View, CA (US); Chetan Kumar Gupta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 13/756,126

(22) Filed: Jan. 31, 2013

(65) Prior Publication Data

US 2014/0215493 A1   Jul. 31, 2014

(51) Int. Cl.
  *G06F 3/00* (2006.01)
  *G06F 11/00* (2006.01)
  *G06F 9/54* (2006.01)

(52) U.S. Cl.
  CPC ............ *G06F 9/542* (2013.01); *G06F 2201/86* (2013.01)

(58) Field of Classification Search
  CPC .............................. G06F 9/542; G06F 2201/86
  USPC ........................................... 719/318; 714/39
  See application file for complete search history.

(56) References Cited

U.S. PATENT DOCUMENTS

| | | | |
|---|---|---|---|
| 5,515,490 A * | 5/1996 | Buchanan et al. | 715/209 |
| 5,937,138 A * | 8/1999 | Fukuda et al. | 386/356 |
| 6,873,983 B2 | 3/2005 | Ugai et al. | |
| 7,904,330 B2 | 3/2011 | Uyama et al. | |
| 2006/0122974 A1 | 6/2006 | Perisic | |
| 2007/0031062 A1 * | 2/2007 | Pal et al. | 382/284 |
| 2009/0082997 A1 | 3/2009 | Tokman et al. | |
| 2012/0173752 A1 * | 7/2012 | Erskins | 709/231 |
| 2012/0198317 A1 * | 8/2012 | Eppolito et al. | 715/202 |
| 2013/0156398 A1 * | 6/2013 | Fradet et al. | 386/231 |

OTHER PUBLICATIONS

Donna j. Peuquet, An event-based spatiotemporal data mode( ESTDM) for temporal analysis of geographical data, 1995.*
Ripley, B.D., "Modelling Spatial Patterns", Journal of the Royal Statistical Society, Series B, vol. 39, Issue 2, Mar. 1977, pp. 172-192.
Unknown., "Spatial Point Patterns", Retrieved from http://www.colorado.edu/geography/class_homepages/geog_4023_s11/Lecture12_PointPat1.pdf, Mar. 11, 2010, 27 pages.
Ripley, B.D., "The second-order analysis of stationary point processes", Journal of Applied Probability 13, Jun. 1976, pp. 255-266.
Wang, et al., "Event Indexing and Searching for High Volumes of Event Streams in the Cloud," 2012 IEEE 36th International Conference on Computer Software and Applications, Jul. 16-20, 2012, pp. 405-415.
Doss, Hani., "On Estimating the Dependence Between Two Point Processes," The Annals of Statistics, vol. 17, No. 2, May 1989, pp. 749-763.

* cited by examiner

*Primary Examiner* — Lechi Truong
(74) *Attorney, Agent, or Firm* — Brooks, Cameron & Huebsch, PLLC

(57) ABSTRACT

Event determination can include selecting a time lag, calculating a dependency value at the time lag between event pairs within a first textual stream and a second textual stream, and ordering the event pairs based on the dependency value.

13 Claims, 3 Drawing Sheets

EVENT DETERMINATION

BACKGROUND

Monitoring systems can include a number of data logs that save data as a textual stream. The data logs can have events recorded with a corresponding timestamp. The corresponding timestamp can relate to a particular time that the event occurred within a system.

DETAILED DESCRIPTION

Figure 1:
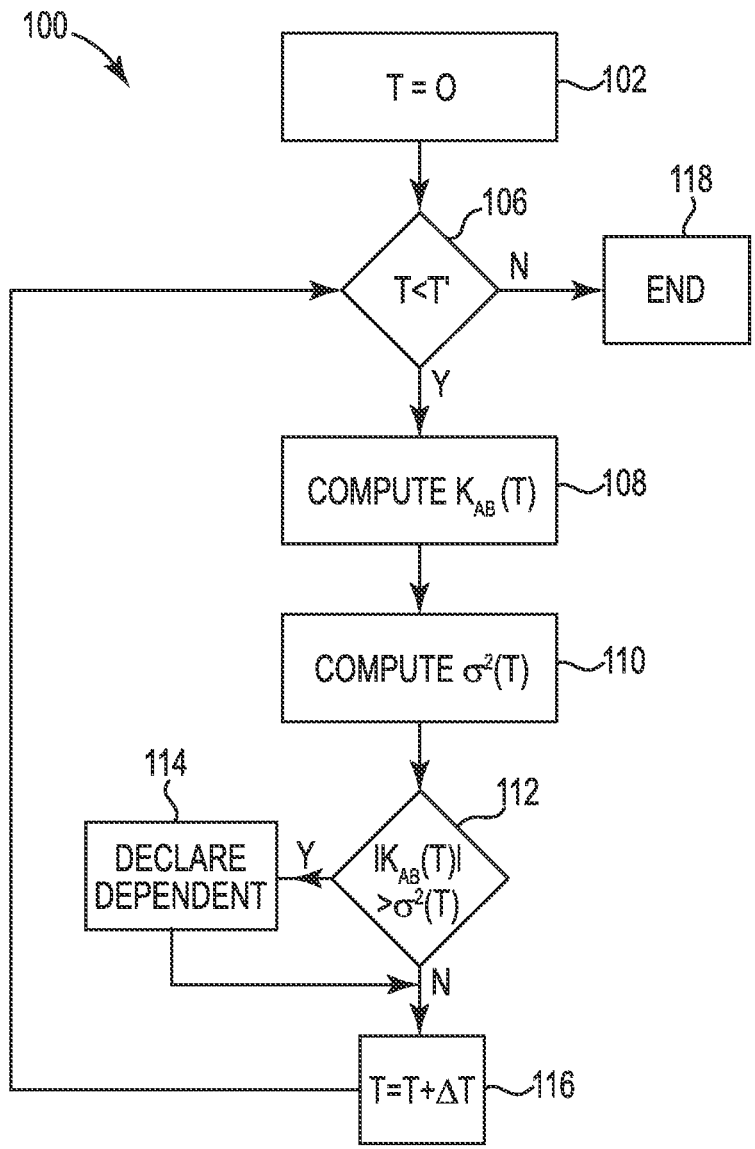
FIG. 1 illustrates a flow diagram for an example of event determination according to the present disclosure.

Event determination can be used to determine a dependence (e.g., whether there exists any dependence, etc.) between events within a number of data streams. The data stream can include textual data with corresponding timestamps. For example, the data stream can be recorded event logs of a computing system. In this example, there is event data that is recorded by the computing system with a timestamp to represent a time that the event data was recorded and/or observed by the computing system. In a different example, the data stream can include twitter feed data with a corresponding timestamp. For example, a particular user can input textual data and submit the data at a particular time. In this example, the particular data can be a message and the particular time can be recorded as a timestamp. The data streams can be organized in a timeline. For example, the event log data can be organized in a timeline based on the corresponding timestamp for a particular time period (e.g., month, week, etc.).

Event determination as described herein can include comparing events within a recorded log with other data streams to determine a dependence (e.g., dependence value, etc.) between the data log events and events within the other data streams. For example, events within the recorded log can be compared to a data stream such as a Twitter stream (e.g., posting text to a website such as Twitter, Facebook, etc.) for a number of users. In this example, a dependence can be calculated between a number of events of the recorded log and a number of events from the Twitter stream (e.g., posts, tweets, etc.).

Event determination can also include selecting a time lag for calculating the dependence between events. The time lag can be a period of time (e.g., seconds, minutes, hours, etc.). The time lag can be used to determine a number of events to compare based on the number of events' corresponding time stamps. For example, a first event within a first data stream can be compared to a second event within a second data stream because the first event and second event are within a particular time lag based on their corresponding timestamp.

The time lag can be used when it is determined particular events may have a causal relationship and/or dependency value within a period of time. For example, it can be determined that it takes approximately ten seconds before an effect from an event is observed. In this example, the time lag can be selected at ten seconds.

Event determination can be used to calculate a dependence value as described herein. The dependence value can be used to help predict future events. For example, a relatively high dependence value for a first event and a second event can be used to predict the second event when the first event occurs again in the future.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of events" can refer to one or more events.

FIG. 1 illustrates a flow diagram 100 for an example of event determination according to the present disclosure. The flow diagram 100 can correspond to utilizing an equation (e.g., Ripley's K Function, Equation 1, etc.) for event determination. Event determination can include calculating a dependency value for a number of events within textual streams.

At box 102 a time lag value (t) between two events can equal a first value (e.g., 0, etc.). A number of dependence values can be calculated for time lag values of (t) from a first time lag value (t) to a maximum time lag value (T') (e.g., end time lag value, final time lag value, etc.). For example, a time lag between two events can be at a time lag value that is equal to 0. In this example, the maximum time lag value T' can equal 30 and a number of dependence values between the first time lag value 0 and the maximum time lag value 30 can be calculated. The maximum time lag (T') (e.g., time window, time period, etc.) can be selected based on a number of factors and/or predictions of a dependency between two events from two textual streams.

At box 106 a determination can be made if the time lag value (t) is less than the maximum time lag (T'). If there is a determination that the time lag (t) is not less than the maximum time lag (T') the flow diagram 100 can end at box 118. That is, the calculation of dependency values can end if the corresponding time lag (e.g., time lag being analyzed, etc.) is not less than the maximum time lag (T').

If the corresponding time (t) is less than the maximum time lag (T') a dependency value of $K_{AB}(t)$ can be calculated at box 108. The dependency value can be calculated utilizing the Equation 1, as described herein.

At box 110 an expected dependency value ($\sigma^2(t)$) (e.g., expected occurrence value, estimate of the variance in the dependency value if the two events being analyzed are independent and/or not dependent, etc.) can be calculated. The expected dependency value can be calculated by determining rates at which each of the events occur. Calculating the expected dependency value can be calculated without a corresponding timeline for each of the event types.

The expected dependency value ($\sigma^2(t)$) can be calculated utilizing a number of vectors. The number of vectors can include a quantity (e.g., number of events, etc.) and also include a direction (e.g., increasing, decreasing, etc.). The number of vectors can be altered to include a number of factors (e.g., seasonalities and/or trends, etc.) of a particular textual stream. For example, the number of vectors can be altered to increase and/or decrease an expected dependency value during a holiday season.

At box 112 a determination can be made whether the absolute value of the dependency value $K_{AB}(t)$ is greater than the expected dependency value ($\sigma^2(t)$). If a determination is made that the absolute value of the dependency value $K_{AB}(t)$ is greater than the expected dependency value ($\sigma^2(t)$) then a determination can be that a first term (A) is dependent on a second term (B) at box 114. As described herein, a normalization and confidence level can be used prior to the determination that an event is dependent on another.

If a determination is made that the absolute value of the dependency value $K_{AB}(t)$ is not greater than the expected dependency value ($\sigma^2(t)$) then the time increment ($\Delta t$) can be added to the current value of the corresponding time lag value (t). Once the time increment ($\Delta t$) is added to the corresponding time (t) the flow diagram 100 can move back to box 106 to determine if the current corresponding time (t) is less than the maximum time lag (T'). That is, a dependency value for each value from a starting time lag value (t) to a maximum time lag value (T') utilizing a number of time increments ($\Delta t$).

Figure 2:
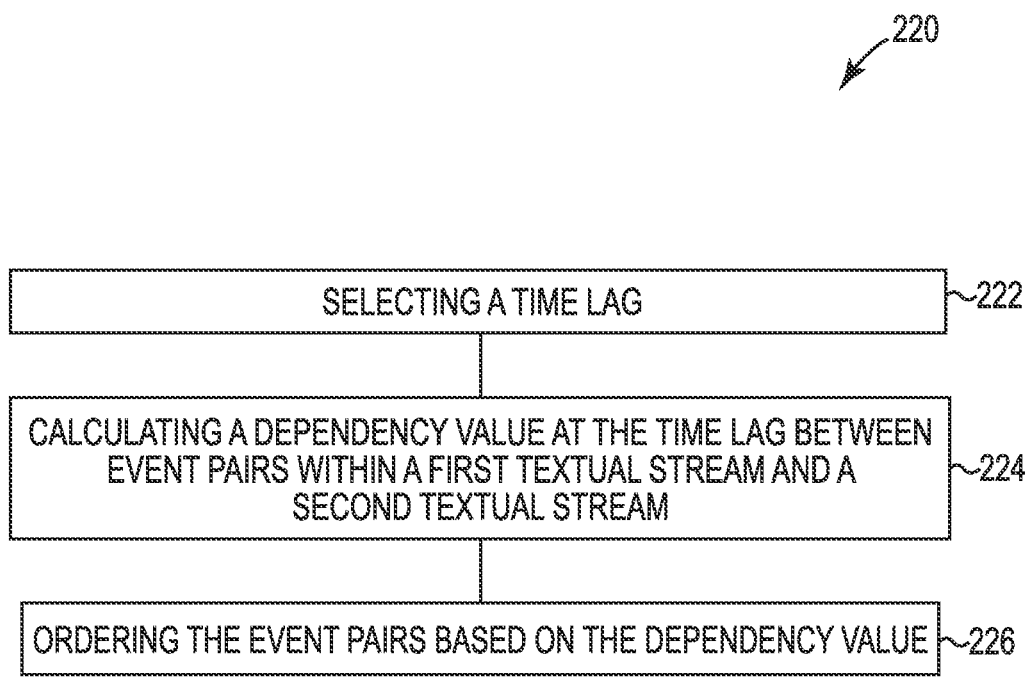
FIG. 2 illustrates a flow chart of a method for an example of event determination according to the present disclosure.

FIG. 2 illustrates a flow chart of a method 220 for an example of event determination according to the present disclosure. The method 220 can be used to calculate a dependency value for predicting future events in a particular data stream (e.g., textual stream, data with corresponding timestamp, etc.). For example, a first event (e.g., data, text, etc. with a corresponding timestamp, etc.) can have a relatively high dependency value with a second event. In this example, an occurrence of the first event can have a high probability of an occurrence of the second event with a different corresponding timestamp.

At box 222, the method 220 can include selecting a time lag. The time lag can represent a period of time between a first event from a first textual stream and a second event from a second textual stream. For example, the time lag can be thirty seconds. In this example, the time period of thirty seconds will be used to determine a time of the first event and determine if during the thirty second time lag later the second event occurred. Based on the occurrence of the second event after the time lag from the occurrence of the first event a dependency value can be calculated for the first event and second event.

The dependency value between a first event and a second event can be different for different time lag values. For example, the dependency value for particular event pairs can be relatively high with a time lag of thirty seconds and the dependency value can be relatively low with a time lag of ten seconds.

A dependency value for an event pair (e.g., a first event and a second event, etc.) can be calculated for a number of different time lags to determine a selected time lag for the event pair. The selected time lag for the event pair can be a time lag with a relatively high dependency value compared to calculated dependency values utilizing different time lags.

At box 224, the method 220 can include calculating a dependency value at the time lag between event pairs within a first textual stream and a second textual stream. The event pairs within the first textual stream and the second textual stream can include an event from the first textual stream at a particular time and an event from the second textual stream at a time between the particular time and the time lag. For example, a first event from the first textual stream can have a timestamp of (t) and the second event from the second textual stream can have a timestamp of (t+time lag).

The textual streams (e.g., the first textual stream, the second textual stream, etc.) can include text data with corresponding timestamps. For example, the textual streams can include, but are not limited to: event data logs, Facebook posts, Twitter posts, etc. The textual streams can be text searchable and timestamp searchable data. For example, the text data within the textual stream can be searched for common events (e.g., words, phrases, terms, etc.) and the timestamp event within the textual stream can be searched and compared to the timestamp event of different textual streams. The timestamp event from the first textual stream can be compared to timestamp event from the second textual stream to determine a number of event pairs that correspond at a selected time lag.

The dependency value can be calculated using a function and/or equation, as described herein (e.g., Ripley's K-function, etc.). The function can be Equation 1.

$$K_{A,B}(t) = \lambda_A^{-1} E \qquad \text{Equation 1}$$

Values A and B can be event types that correspond to two event types (e.g., event type A, event type B, etc.). The event types can include particular phrases (e.g., text, words, data event, etc.) from within a corresponding textual stream (e.g., textual stream A, textual stream B, etc.). For example, value A can be a timestamp for a corresponding event type A within textual stream A. There can be multiple value A events within textual stream A. Each value A event can have a number of corresponding value B events. The value B can be a timestamp for an event that has a selected time lag (t) from the timestamp of the event corresponding to value A.

The Equation 1 can be evaluated for a number of selected time lag values (t). For example, each of the number of selected time lag values (t) can result in a different calculated dependency value. A dependency value can be calculated for the number of selected time lag values (t) to determine a dependency between event type A and event type B.

The $\lambda_A$ within Equation 1 can represent an expected occurrence value (e.g., expected number of occurrences of a type A events at a particular time interval, etc.). The expected occurrence value can be predicted based on the type of textual streams being utilized. For example, the expected occurrence value can be 2(t) when the textual stream A is a data log and textual stream B is a different type of textual stream. The $\lambda_A$ can represent a quantity of occurrences of type A events.

The E within Equation 1 can represent an average number of observed or discovered type A events within the time lag (t) of a selected and/or randomly selected type B event. For example, a type B event can be selected and the number of type A events that are within the time lag of the type B event can be determined and represent E within Equation 1. In another example, a type B event can occur at time 00:00 within textual stream B and the time lag (t) can be 00:30. In this example, the number of type A events that occur between 00:00 and 00:30 within textual stream A can be recorded and/or observed. In additional example, E can represent an average number of type A occurrences within a time lag of a type B occurrence. The number of type A events that occur within textual stream A can be E within Equation 1 when there is only a single type B event within the textual stream B. When there are multiple type B events within textual stream B, the number of type A events can be recorded for each type B events and added to a total number of events and represent E within Equation 1.

The dependency value can be a deviation (e.g., difference, etc.) between the expected number of events and the observed number of events within the time lag (t). A number of event pairs (e.g., type A events and corresponding type B events, etc.) can be selected based on the dependency value and/or deviation from the expected occurrence value. The number of selected event pairs can include event type pairs where the dependency value is greater than a pre-determined confidence level. The pre-determined confidence level can be determined based on the type of textual streams and/or event types used.

For example, particular event types can occur more often within particular textual streams. In this example, the expected occurrence value can be altered to account for the increase in the particular event types. In the same example, the pre-determined confidence level can be increased to account for the increase in the particular type of events. A number of selected event pairs can be above the pre-determined confidence level and ordered based on the calculated dependency value.

The expected occurrence value and/or the pre-determined confidence level can be altered based on a number of seasonalities and/or trends of one or both of the textual streams. The number of seasonalities can include an increase and/or decrease in an expected occurrence of particular event types for a particular period within a year (e.g., Christmas season, summer, school season, etc.). The number of trends can include trending increases and/or decreases of event types within one or both of the textual streams.

At box 226, the method 220 can include ordering the event pairs based on the dependency value. The selected event pairs can be ordered based on the calculated dependency value. Ordering the event pairs based on the dependency value and/or deviation from the expected number of occurrences can be used to determine a number of dependency pairs for a particular time lag (t). Ordering the event pairs based on the dependency value and/or deviation from the expected number of occurrences can also be used to determine a selected time lag (t) for a particular event pairs.

Figure 3:
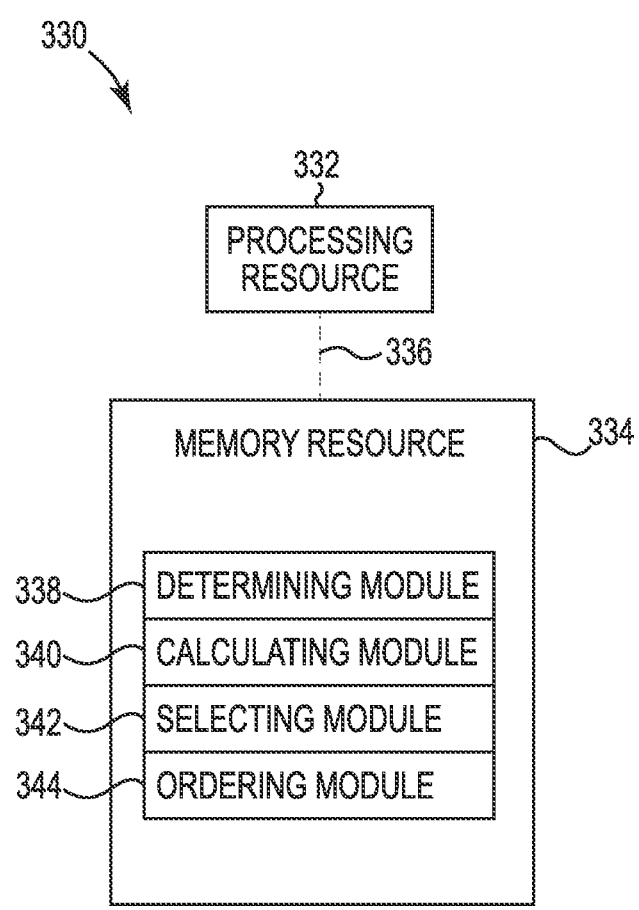
FIG. 3 illustrates a diagram of an example of a computing system according to the present disclosure.

FIG. 3 illustrates a block diagram of an example of a computing system 330 according to the present disclosure. The computing system 330 can utilize software, hardware, firmware, and/or logic to perform a number of functions.

The computing system 330 can be any combination of hardware and program instructions configured to share information. The hardware, for example can include a processing resource 332 and/or a memory resource 334 (e.g., computer-readable medium (CRM), machine readable medium (MRM), database, etc.) A processing resource 332, as used herein, can include any number of processors capable of executing instructions stored by a memory resource 334. Processing resource 332 may be integrated in a single device or distributed across multiple devices. The program instructions (e.g., computer-readable instructions (CRI)) can include instructions stored on the memory resource 334 and executable by the processing resource 332 to implement a desired function (e.g., sharing security context information).

The memory resource 334 can be in communication with a processing resource 332. A memory resource 334, as used herein, can include any number of memory components capable of storing instructions that can be executed by processing resource 332. Such memory resource 334 can be a non-transitory CRM. Memory resource 334 may be integrated in a single device or distributed across multiple devices. Further, memory resource 334 may be fully or partially integrated in the same device as processing resource 332 or it may be separate but accessible to that device and processing resource 332. Thus, it is noted that the computing system 330 may be implemented on a user and/or a participant device, on a server device and/or a collection of server devices, and/or on a combination of the user device and the server device and/or devices.

The processing resource 332 can be in communication with a memory resource 334 storing a set of CRI executable by the processing resource 332, as described herein. The CRI can also be stored in remote memory managed by a server and represent an installation package that can be downloaded, installed, and executed. The computing system 330 can include memory resource 334, and the processing resource 332 can be coupled to the memory resource 334.

Processing resource 332 can execute CRI that can be stored on an internal or external memory resource 334. The processing resource 332 can execute CRI to perform various functions, including the functions described with respect to FIGS. 1 and 2. For example, the processing resource 332 can execute CRI to calculate a dependency value at the time lag between event pairs within a first textual stream and a second textual stream.

A number of modules 338, 340, 342, 344, can include CRI that when executed by the processing resource 332 can perform a number of functions. The number of modules 338, 340, 342, 344 can be sub-modules of other modules. For example, the selecting module 342 and the ordering module 344 can be sub-modules and/or contained within the same computing system. In another example, the number of modules 338, 340, 342, 344 can comprise individual modules at separate and distinct locations (e.g., CRM, etc.).

A determination module 338 can include CRI that when executed by the processing resource 332 can determine a time lag for a number of event log events that correspond to a number of textual stream events. The determination module 338 can include CRI that when executed by the processing resource can determine the time lag based on the type of events and select the time lag to be used by a calculating module (e.g., calculating module 340, etc.).

The determination module 338 can include CRI that when executed by the processing resource 332 can also determine a number of trends for the log events and the number of textual stream events. For example, the determination module 338 can include CRI that when executed by the processing resource 332 can use the selected events to determine if trends and/or seasonalities are likely to affect the calculated dependency value. The determination module 338 can send the determined trends and/or seasonalities to a calculating module (e.g., calculating module 340, etc.).

A calculating module 340 can include CRI that when executed by the processing resource 332 can calculate a dependency value for the number of event log events and the number of textual stream events utilizing the time lag and the number of trends. The calculating module 340 can utilize functions and/or equations (e.g., Equation 1, etc.) to calculate the dependency value.

A selecting module 342 can include CRI that when executed by the processing resources 332 can select a number of dependency pairs based on a predetermined confidence level. The selecting module 342 can select the number of dependency pairs based on a confidence level for a particular trend and/or type of event pairs. For example, the confidence level can be higher or lower based on a particular type of event pairs.

The ordering module 344 can include CRI that when executed by the processing resource 332 can order the number of selected dependency pairs based on an extent of deviation from an expected occurrence value. The ordering module 344 can include CRI that when executed by the processing resource 332 can normalize the extent of deviation prior to ordering the selected dependency pairs.

A memory resource 334, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 334 can be integral, or communicatively coupled, to a computing system, in a wired and/or a wireless manner. For example, the memory resource 334 can be an internal memory, a portable memory, a portable disk, or a memory associated with another computing resource (e.g., enabling CRIs to be transferred and/or executed across a network such as the Internet).

The memory resource 334 can be in communication with the processing resource 332 via a communication link (e.g., path) 336. The communication link 336 can be local or remote to a machine (e.g., a computing system) associated with the processing resource 332. Examples of a local communication link 336 can include an electronic bus internal to a machine (e.g., a computing system) where the memory resource 334 is one of volatile, non-volatile, fixed, and/or removable storage medium in communication with the processing resource 332 via the electronic bus.

The communication link 336 can be such that the memory resource 334 is remote from the processing resource (e.g., processing resource 332), such as in a network connection between the memory resource 334 and the processing resource (e.g., 332). That is, the communication link 336 can be a network connection. Examples of such a network connection can include a local area network (LAN), wide area network (WAN), personal area network (PAN), and the Internet, among others. In such examples, the memory resource 334 can be associated with a first computing system and the processing resource 332 can be associated with a second computing system (e.g., a Java® server). For example, a processing resource 332 can be in communication with a memory resource 334, wherein the memory resource 334 includes a set of instructions and wherein the processing resource 332 is designed to carry out the set of instructions.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for event determination, comprising:
selecting a time lag for a number of event log events, wherein the time lag is determined based on an estimation of a response time between the event log events and a number of textual stream events;
determining a number of trends for the log events and the number of textual stream events;
calculating a dependency value at the time lag between event pairs within a first textual stream and a second textual stream utilizing the time lag and the number of trends, wherein the dependency value is a deviation between an expected number of event pairs and a number of observed event pairs during the time lag; and
ordering the event pairs based on an extent of deviation of the dependency value from an expected occurrence value.

2. The method of claim 1, wherein selecting the time lag includes determining a response time between a first event within the first textual stream and a second event within the second textual stream.

3. The method of claim 1, wherein ordering the event pairs includes the event pairs for each of a number of selected time lags.

4. The method of claim 1, wherein calculating the dependency value includes selecting a particular event type from the first textual stream and calculating a dependency value for a number of event types that are different from the particular event type.

5. The method of claim 1, wherein calculating the dependency value includes calculating dependency values for a number of time lags and ordering the event pairs for the number of time lags.

6. A non-transitory computer-readable medium storing a set of instructions executable by a processor to cause a computer to:
determine a number of events for an event log and a number of events for a textual stream;
determine a number of trends for the log events and the number of textual stream events:
calculate a dependency value of a number of event pairs for a number of event log events corresponding to a number of textual stream events at a particular time lag and the number of trends, wherein the dependency value is a deviation between an expected number of event pairs and a number of observed event pairs during the time lag and wherein the time lag is determined based on an estimation of a response time between the number of event log events and the number of textual stream events; and
order the number of event pairs based on an extent of deviation of the dependency value from an expected occurrence value.

7. The medium of claim 6, wherein the expected occurrence value is a value that represents no dependency between the number of event log events and the number of textual stream events.

8. The medium of claim 6, wherein the number of events are determined based on a corresponding time stamp.

9. The medium of claim 6, wherein the dependency value is calculated utilizing a Ripley's K-function.

10. The medium of claim 6, wherein the dependency value is calculated by incorporating a number of trends and seasonalities.

11. A system for event determination, the system comprising a processing resource in communication with a non-transitory computer readable medium, wherein the non-transitory computer readable medium includes a set of instructions and wherein the processing resource is designed to carry out the set of instructions to:
determine a time lag for a number of event log events that correspond to a number of textual stream events, wherein the time lag is determined based on an estimation of a response time between the event log events and the number of textual stream events;
determine a number of trends for the log events and the number of textual stream events;
calculate a dependency value for the number of event log events and the number of textual stream events utilizing the time lag and the number of trends, wherein the dependency value is a deviation between an expected number of event pairs and a number of observed event pairs during the time lag;

select a number of dependency pairs based on a predetermined confidence level; and order the number of selected dependency pairs based on an extent of deviation of the dependency value from an expected occurrence value.

12. The computing system of claim 11, wherein the number of event log events are randomly compared to each of the number of textual stream events that correspond to the time lag.

13. The computing system of claim 11, wherein the predetermined confidence level is determined based on a desired number of dependency pairs.

* * * * *

UNITED STATES PATENT AND TRADEMARK OFFICE
CERTIFICATE OF CORRECTION

| | | Page 1 of 1 |
|---|---|---|
| PATENT NO. | : 9,063,802 B2 | |
| APPLICATION NO. | : 13/756126 | |
| DATED | : June 23, 2015 | |
| INVENTOR(S) | : Krishnamurthy Viswanathan et al. | |

It is certified that error appears in the above-identified patent and that said Letters Patent is hereby corrected as shown below:

In the claims

In column 8, line 24, in Claim 6, delete "events:" and insert -- events; --, therefor.

Signed and Sealed this
Fifteenth Day of December, 2015

Michelle K. Lee
*Director of the United States Patent and Trademark Office*